United States Patent
Semple

(10) Patent No.: US 12,187,293 B1
(45) Date of Patent: Jan. 7, 2025

(54) VEHICLE LATERAL AVOIDANCE

(71) Applicant: Zoox, Inc., Foster City, CA (US)

(72) Inventor: Tod Cameron Semple, Woodside, CA (US)

(73) Assignee: Zoox, Inc., Foster City, CA (US)

(*) Notice: Subject to any disclaimer, the term of this patent is extended or adjusted under 35 U.S.C. 154(b) by 297 days.

(21) Appl. No.: 17/726,199

(22) Filed: Apr. 21, 2022

(51) Int. Cl.
*B60W 30/08* (2012.01)
*B60W 30/10* (2006.01)
*B60W 30/18* (2012.01)
*B60W 40/109* (2012.01)
*B60W 40/114* (2012.01)

(52) U.S. Cl.
CPC .......... *B60W 40/109* (2013.01); *B60W 30/08* (2013.01); *B60W 30/10* (2013.01); *B60W 30/18018* (2013.01); *B60W 40/114* (2013.01); *B60W 2420/403* (2013.01); *B60W 2554/4049* (2020.02)

(58) Field of Classification Search
CPC .... B60W 40/109; B60W 30/08; B60W 30/10; B60W 30/18018; B60W 40/114; B60W 2420/403; B60W 2554/4049
See application file for complete search history.

(56) References Cited

U.S. PATENT DOCUMENTS

| | | | |
|---|---|---|---|
| 9,227,632 B1 * | 1/2016 | Lee | B60W 30/0956 |
| 2019/0212744 A1 * | 7/2019 | Milstein | B60W 40/02 |
| 2019/0258260 A1 * | 8/2019 | Sunil Kumar | G05D 1/024 |
| 2020/0216085 A1 * | 7/2020 | Bobier-Tiu | B60W 40/08 |
| 2021/0031760 A1 * | 2/2021 | Ostafew | G05D 1/0088 |
| 2021/0108936 A1 * | 4/2021 | Seegmiller | B60W 60/00276 |
| 2022/0250644 A1 * | 8/2022 | Larsson | B60W 60/0015 |
| 2024/0059277 A1 * | 2/2024 | Patil | G06V 20/586 |

FOREIGN PATENT DOCUMENTS

KR  20180086632 A  *  1/2017

* cited by examiner

*Primary Examiner* — Adam R Mott
*Assistant Examiner* — Heather J Keniry
(74) *Attorney, Agent, or Firm* — Lee & Hayes, P.C.

(57) ABSTRACT

Techniques for determining a modified lateral motion boundary of a vehicle in an environment are discussed herein. Techniques may include determining a lateral motion boundary for a vehicle in an environment, based partly on data associated with the environment and/or the vehicle, where representations of objects in the environment may be projected onto the lateral motion boundary. The lateral motion boundary may be modified based on such projections to determine a modified lateral motion boundary. The modified lateral motion boundary may include an open lateral boundary, configured by closing off portions of the lateral motion boundary corresponding to the projections, allowing a vehicle to move laterally to traverse the environment and avoid the objects.

20 Claims, 6 Drawing Sheets

VEHICLE LATERAL AVOIDANCE

BACKGROUND

Autonomous vehicles may use various sensors to navigate around objects in an environment. Techniques can be used to determine classifications and positioning of such objects. Current techniques often involve processing substantial data points associated with objects, which may present challenges in resource-constrained environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
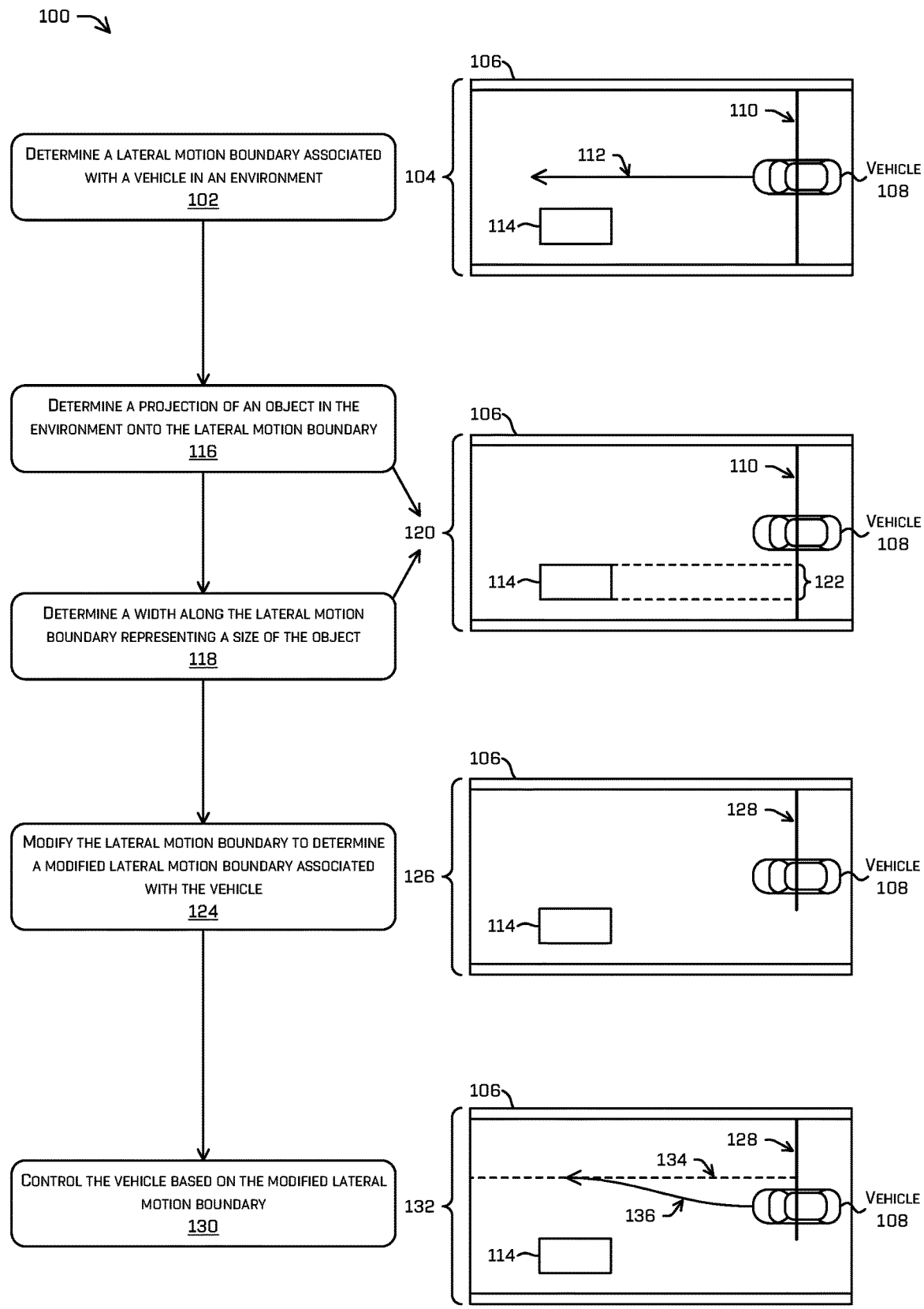
FIG. 1 is a pictorial flow diagram of an example process of determining a lateral motion boundary of a vehicle in an environment, determining a projection of an object in the environment onto the lateral motion boundary, determining a width along the lateral motion boundary representing a size of the object, modifying the lateral motion boundary to determine a modified lateral motion boundary, and controlling the vehicle using the modified lateral motion boundary.

Techniques for utilizing a lateral motion boundary to determine an open corridor in an environment for passage of an autonomous vehicle, a simulated smart agent, and/or the like are described herein. For example, techniques may include determining a one-dimensional lateral motion boundary associated with a vehicle traversing an environment. In some examples, environment data may indicate a width of a roadway on which a vehicle is set to traverse according to a trajectory. Objects in the environment may be detected and projected onto the lateral motion boundary of the vehicle as a width representing the size of the object. Projections of objects on the lateral motion boundary may be utilized to determine an open corridor of the lateral motion boundary in which the vehicle may utilize to move laterally about the open corridor and traverse around the detected objects along the trajectory.

Various techniques described herein may include determining a lateral motion boundary associated with a vehicle traversing an environment. For example, the lateral motion boundary may have a first side extending in a first direction substantially lateral from the vehicle and a second side extending in a second direction substantially lateral from the vehicle opposite the first side. Additional techniques include determining, for an object in the environment, a projection of the object onto the lateral motion boundary. Based at least in part on the projection, a side association of the object may be determined on the lateral motion boundary, where the side association corresponds to the first side or the second side of the lateral motion boundary. Additionally, or alternatively, based at least in part on the projection, a length of the projection may be determined on the lateral motion boundary, where the length represents a size of the object in the environment. Further, the techniques may include modifying, based at least in part on the side association of the object and/or the length of the object, the lateral motion boundary to determine a modified lateral motion boundary associated with the vehicle. The vehicle may be controlled based at least in part on the modified lateral motion boundary.

In some examples, the techniques discussed herein may be implemented in the context of a vehicle, such as an autonomous vehicle traversing a physical environment. The autonomous vehicle may capture sensor data as the vehicle traverses an environment and may determine object detections by leveraging the sensor data in various ways. In some examples, a variety of sensor data may be utilized to determine the object detections, such as, for example, lidar data, radar data, time-of-flight data, or any other depth data. In some examples, the sensor data may be utilized to determine projection data representing the width of an object in the physical environment on a lateral motion boundary of a vehicle.

Additionally, or alternatively, the techniques discussed herein may be implemented in the context of a simulated vehicle, such as a smart agent executing in a simulated environment of a driving simulation under the control of a simulation component. The smart agent may traverse the environment according to a route (e.g., a trajectory) and/or based on log data associated with the driving simulation. Additionally, or alternatively, the smart agent may capture simulated sensor data as the smart agent traverses a simulated environment. In some examples, the simulated sensor data may be configured similar to the sensor data captured by the autonomous vehicle traversing the physical environment, as previously described. Additionally, or alternatively, the simulated sensor data may be utilized to determine projection data representing the width of a simulated object in the simulated environment on a lateral motion boundary of a vehicle.

Take, for example, a vehicle (e.g., an autonomous vehicle or a smart agent) traversing an environment. As described in the various examples, herein, a vehicle may refer to an autonomous vehicle operating in a physical environment, or to a simulated vehicle, such as, for example, a smart agent operating in a simulated environment. A component associated with the vehicle, such as, for example, a planning component and/or a lateral boundary component, may determine a lateral motion boundary for the vehicle based on various data associated with the environment. For example, the lateral motion boundary may be sized corresponding to the geometry of a roadway (e.g., a width of a roadway) and/or a lane of a roadway on which the vehicle is traversing. Additionally, or alternatively, the lateral motion boundary may be configured to have a fixed size associated with the vehicle and/or the environment. For example, in some open areas of the environment (e.g., a parking lot) the lateral motion boundary may be sized a fixed amount extending out laterally from the vehicle on both sides.

In some examples, the vehicle and/or a component thereof, such as, for example, the planning component and/or a projection component, may periodically determine projections of objects onto the lateral motion boundary at future time horizons in the environment. For instance, the vehicle may project an object onto a lateral motion boundary according to a time interval, such as once per second, twice per second, etc. The vehicle may follow a trajectory as it traverses the environment, such as a trajectory based on the geometry of the roadway on which the vehicle is driving in the environment. In some examples, the vehicle may determine predicted future points along the trajectory, which may be based on a period of time (e.g., a number of seconds into the future) and/or a distance (e.g., a fixed distance from the current position of the vehicle based on a current velocity). When following a trajectory, the vehicle may establish configuration line between a predicted future point along the trajectory and a point associated with the vehicle (e.g., a central point of the vehicle) which the vehicle may use for positioning the lateral motion boundary. For example, the lateral motion boundary may be configured to be substantially perpendicular to the configuration line.

As previously described, the planning component and/or the projection component may project objects onto the lateral motion boundary according to various techniques. In some examples, an object may be detected in the environment, on the roadway or proximal to the roadway (e.g., in a curbside parking zone), and a bounding box representing the object may be determined and utilized for projection onto the lateral motion boundary. For example, a vehicle may be traversing an environment on a substantially straight roadway. In some examples, a width determined using the outermost edges of the bounding box may be projected back toward the vehicle and onto the lateral motion boundary.

Additionally, or alternatively, a vehicle may be traversing an environment on a roadway having a curvature (e.g., a roadway having a turn). In some examples, the predicted future point may be along the curvature of the road, causing the configuration line to be unparallel with a yaw associated with the vehicle at a given point in time. In such scenarios, the lateral motion boundary may be configured substantially perpendicular to the configuration line. As such, a width determined using the outermost edges of the bounding box associated with a detected object may be projected back toward the vehicle along the configuration line and onto the lateral motion boundary. Additionally, or alternatively, the predicted future point may be positioned along the trajectory to a future position where the vehicle may be proximal to the detected object. In some examples, the planning component may determine a predicted yaw of the vehicle at the predicted future point. The projection component may project the lateral motion boundary forward toward the object along the trajectory and to the predicted future point where the lateral motion boundary may be positioned to be substantially perpendicular to the predicted yaw of the vehicle, thus representing the lateral motion boundary of the vehicle at the predicted future point on the trajectory. The projection component may determine a width using the outermost edges of the bounding box associated with the detected object, which the projection component may project onto the projected lateral motion boundary. In some examples, the projections on the projected lateral motion boundary may be replicated onto the lateral motion boundary of the vehicle.

The process(es) for projecting an object onto a lateral motion boundary may be repeated any number of times for each object in the environment and/or within the bounds of the lateral motion boundary.

The lateral boundary component may determine a modified lateral motion boundary in various ways based on object projections onto the lateral motion boundary. For example, the lateral boundary component may modify the lateral motion boundary to determine a modified lateral motion boundary having an open corridor configured such that the vehicle may move laterally through the open corridor to follow a trajectory. For example, a vehicle may be configured to deviate from an original trajectory in a lateral direction that corresponds to the open corridor represented in the modified lateral motion boundary.

In some examples, an object projection may correspond to a particular side of the lateral motion boundary. For example, an object projection may correspond to a first side of the lateral motion boundary that extends laterally from a first side of the vehicle and/or a second side of the lateral motion boundary that extends laterally from a second side of the vehicle, opposite the first side. In some examples, object projections may correspond to only the first side, and as such, the lateral boundary component may modify the lateral motion boundary to determine a modified lateral motion boundary by closing off the first side of the lateral motion boundary and configuring the second side as an open corridor through which the vehicle may traverse. Additionally, or alternatively, object projections may correspond to only the second side, and as such, the lateral boundary component may modify the lateral motion boundary to determine a modified lateral motion boundary by closing off the second side of the lateral motion boundary and configuring the first side as the open corridor through which the vehicle may traverse.

Additionally, or alternatively, object projections may correspond to both sides of the lateral motion boundary. For example, a first object projection may correspond to a portion of the first side of the lateral motion boundary and a second object projection may correspond to a portion of the second side of the lateral motion boundary. In such scenarios, the lateral motion boundary may be modified by closing off a portion of the first side from the end of the first side and toward the vehicle by at least an amount represented by the first object projection and a portion of the second side from the end of the second side and toward the vehicle by at least an amount represented by the second object projection. For example, the lateral boundary component may truncate either side of the lateral motion boundary by removing a portion between one of the endpoint(s) of the lateral motion boundary and a point where the projection intersects the lateral motion boundary. As a result, the modified lateral motion boundary may be configured with an open corridor composed partly of the first side and/or second side in between the closed off portions of the lateral motion boundary.

The modified lateral motion boundary may be utilized to make determinations and/or control motion of the vehicle in the environment. For example, it may be determined that the open corridor of the modified lateral motion boundary exceeds a threshold width associated with the vehicle (e.g., a width comprising the width of the vehicle and a safety margin) such that the vehicle may pass through the open corridor. In some examples, the vehicle may be controlled to follow along a trajectory and move laterally from the trajectory to a center line of the open corridor of the modified lateral motion boundary while still following the general direction of the trajectory. Additionally, or alternatively, it may be determined that the open corridor of the lateral motion boundary does not exceed a threshold width associated with the vehicle such that the vehicle may not pass through the open corridor. In some examples, the vehicle may be controlled to perform a safe stop operation and/or may be controlled using a model configured to plan an alternate route for traversing around the objects, such as, for example, one or more route planning algorithm(s), one or more trained models, and the like.

Additional data may be leveraged to make determinations for controlling the vehicle. For example, the vehicle may determine whether a detected object is an object that is followable or unfollowable. In some examples, an object may be classified as a followable object if the object is traveling above a threshold speed (e.g., not stationary, having a speed within a threshold range of the roadway speed limit, and/or having a speed within a threshold range of the speed of the vehicle) and/or if the object has a yaw substantially similar to the yaw of the vehicle (e.g., is traveling in the same direction of the vehicle). Additionally, or alternatively, an object may be classified as an unfollowable object if the object is traveling below a threshold speed (e.g., stationary, having a speed outside of a threshold range of the roadway speed limit, and/or having a speed outside of a threshold range of the speed of the vehicle) and/or if a yaw associated with the object is outside of a threshold yaw range from a yaw associated with the vehicle (e.g., is traveling in a different direction from the vehicle). If an object is determined to be a followable object, the vehicle may be controlled to follow the object. In some examples, controlling the vehicle to follow the object may comprise controlling the vehicle according to the trajectory and causing the vehicle to not move laterally to avoid the object or controlling the vehicle to move laterally behind the object. Additionally, or alternatively, if an object is determined to be an unfollowable object, the vehicle may move laterally around the object according to the modified lateral motion boundary.

The techniques discussed herein may improve the functioning of a computing device, such as a computing device of an autonomous vehicle and/or a computing device executing a driving simulation, in a number of ways. Implementing these techniques on a live vehicle may result in quicker and lower cost trajectory modification while the vehicle is traversing an environment. Alternatively, implementing these techniques in vehicle simulations may require less computational and/or processing resources resulting in greater processing speeds of simulations and more realistic vehicle simulations in general, as simulated smart agents may modify trajectories on the fly rather than executing according to inaccurate simulation scenarios. For example, using object projections onto a lateral motion boundary to determine a modified lateral motion boundary having at least one open corridor, one or more lateral movements may be determined on the fly to apply to an existing vehicle trajectory. Causing a vehicle to move laterally around an object and/or modifying an existing trajectory to incorporate the lateral move requires less data and can be computed faster than recomputing a new trajectory to avoid a detected object. Utilizing such a modified lateral motion boundary to control a vehicle according to an existing trajectory may significantly reduce an amount of processing power and/or memory utilized by the system to avoid object collisions when compared to computing a new trajectory and/or planning an alternative vehicle route utilizing a model, such as, for example, one or more route planning algorithm(s), one or more trained models, and the like. The techniques described herein may also reduce latency for route planning. As may be understood, reducing latency of route planning may improve safety outcomes, particularly in the context of vehicles and autonomous vehicles. Thus, the techniques described herein may improve a functioning of a computing device as well as improve safety outcomes.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in a manufacturing assembly line context, in an aerial surveying context, or in a nautical context. Additionally, the techniques described herein may be used with real data (e.g., captured using sensor(s)), simulated data (e.g., generated by a simulator), or any combination of the two.

FIG. 1 is a pictorial flow diagram of an example process 100 of determining a lateral motion boundary of a vehicle in an environment, determining a projection of an object in the environment onto the lateral motion boundary, determining a width along the lateral motion boundary representing a size of the object, modifying the lateral motion boundary to determine a modified lateral motion boundary, and controlling the vehicle using the modified lateral motion boundary.

At operation 102, the process 100 may include determining a lateral motion boundary associated with a vehicle in an environment. In some examples, the lateral motion boundary may include a first side extending in a first substantially lateral direction from the vehicle and/or a second side opposite the first side and extending in a second substantially lateral direction from the vehicle. Additionally, or alternatively the lateral motion boundary may be sized a first width.

An example 104 illustrates the environment 106 including a vehicle 108. In some examples, the environment 106 may be a physical environment and the vehicle 108 may be an autonomous vehicle operating under the control of one or more autonomous vehicle control components, as described in more detail with respect to FIG. 6. Additionally, or alternatively, the environment 106 may be a simulated environment and the vehicle 108 may be a simulated vehicle, such as, for example, a smart agent operating in a driving simulation under the control of one or more simulation components, such as, for example, a smart agent controller and/or the simulation component(s) described in more detail below. In some examples, the vehicle 108 may include the lateral motion boundary 110 sized the first width. Additionally, or alternatively, the vehicle 108 may be traversing the environment 106 according to a trajectory 112, such as, for example, a trajectory 112 following along the geometry of the roadway in the environment 106, as illustrated in FIG. 1. Additionally, or alternatively, the environment 106 may include an object 114.

In some examples, the lateral motion boundary 110 may be determined for the vehicle 108 based on various data associated with the environment 106. For example, the lateral motion boundary 110 may be sized corresponding to the geometry of a roadway (e.g., a width of a roadway) and/or a lane of a roadway on which the vehicle 108 is traversing, as illustrated in FIG. 1. Additionally, or alternatively, while not represented in FIG. 1, the lateral motion boundary 110 may be configured to have a fixed size associated with the vehicle 108 and/or the environment 106. For example, in some open areas of the environment 106 (e.g., a parking lot) the lateral motion boundary 110 may be sized a fixed amount extending out laterally from the vehicle 108 on both sides.

At operation 116, the process 100 may include determining, for an object 114 in the environment 106, a projection of the object 114 onto the lateral motion boundary 110.

Additionally, or alternatively, at operation 116, the process 100 may include receiving sensor data from a sensor operating in connection with a perception system of a vehicle 108 (e.g., autonomous vehicle), in an environment 106 to determine object detections and/or projections. Although discussed in the context of sensor data, the operation 116 can include receiving any three-dimensional data or data comprising a depth component. The semantic information can include, for example, one or more semantic classification(s), label(s), or segmentation information. In some instances, the operation 116 can include receiving a plurality of sensor datasets from a plurality of sensors operating in connection with the perception system. In some instances, the operation 116 can include combining or fusing data from two or more sensors (and/or over a period of time) into a single lidar dataset (also referred to as a "meta spin"). In some instances, the operation 116 can include extracting a portion of the sensor data for processing, such as over a period of time. In some instances, the operation 116 can include receiving radar data (or other sensor data) and associating the radar data with the sensor data to generate a more detailed representation of an environment.

As noted above, the sensor data (e.g., sensor dataset(s)) can be associated with semantic information. An example of such techniques for determining and associating the sensor data with the semantic information are discussed in, for example, in U.S. patent application Ser. No. 15/820,245 titled "Sensor Data Segmentation" and filed Nov. 21, 2017, which is incorporated by reference herein in its entirety for all purposes.

The semantic information may be associated with static and/or dynamic object(s) 114 in the environment 106 for classification (e.g., determining if an object is followable or unfollowable) and/or trajectory planning. Portions of the environment 106 corresponding to a ground, static objects 114, and/or dynamic objects 114 can be identified and labeled with such semantic information. In some examples, data can be segmented based at least in part on the semantic information. In some instances, a list of dynamic objects 114, static objects 114, and/or an identification of the ground can be provided to a planner system to generate a trajectory 112 for the vehicle 108 that traverses a drivable surface and avoids or otherwise accounts for the dynamic and/or static objects 114 identified herein.

In some examples, the vehicle 108 and/or a projection component associated with the vehicle 108 may be configured to periodically make projections of object(s) 114 onto the lateral motion boundary 110 at future time horizons of the vehicle 108 in the environment 106, such as, for example, according to a time interval (e.g., once per second, twice per second, etc.). In some examples, a future point along the trajectory 112 may be determined. In some examples, a predicted future point may be based on a period of time (e.g., a number of seconds into the future) and/or a distance (e.g., a fixed distance into the future based on a current velocity of the vehicle). In some examples, a configuration line may be established between the predicted future point and a point associated with the vehicle 108 (e.g., a central point of the vehicle 108) which may be utilized for positioning the lateral motion boundary 110. For example, the lateral motion boundary 110 may be configured to be substantially perpendicular to the configuration line, thus aligning the lateral motion boundary 110 substantially parallel to a yaw of the vehicle 108 at a given future point in time.

In the context of a vehicle 108, such as an autonomous vehicle traversing a physical environment, the vehicle 108 may include one or more sensors configured to capture sensor data as the vehicle 108 traverses an environment 106 and may determine object detections by leveraging the sensor data in various ways. In some examples, a variety of sensor data may be utilized to determine the object detections, such as, for example, lidar data, radar data, time-of-flight data, or any other depth data. In some examples, the sensor data may be utilized to determine projection data representing the width of an object 114 in the physical environment 106 on a lateral motion boundary 110 of a vehicle 108.

Additionally, or alternatively, in the context of a simulated vehicle 108, such as a smart agent executing in a simulated environment of a driving simulation, the simulated vehicle 108 may traverse the simulated environment 106 according to a route (e.g., a trajectory 112) and/or based on log data associated with the driving simulation. Additionally, or alternatively, the simulated vehicle 108 may include one or more simulated sensors configured to capture simulated sensor data as the simulated vehicle 108 traverses a simulated environment 106. In some examples, the simulated sensor data may be configured similar to the sensor data captured by the autonomous vehicle 108 traversing the physical environment 106, as previously described. Additionally, or alternatively, the simulated sensor data may be utilized to determine projection data representing the width of a simulated object 114 in the simulated environment 106 on a lateral motion boundary 110 of a vehicle 108.

As noted above, the simulated sensor data (e.g., simulated sensor dataset(s)) can cause a log-based agent to perform the perception techniques of an autonomous vehicle using simulated sensors under the control of a simulation component. An example of such techniques for capturing simulated sensor data using one or more simulated sensors under the control of a simulation component are discussed in, for example, in U.S. patent application Ser. No. 17/192,501 titled "Closed Loop Replay-Based Simulations" and filed Mar. 4, 2021, which is incorporated by reference herein in its entirety for all purposes.

At operation 118, the process 100 may include determining a width of the projection on the lateral motion boundary 110. In some examples, the width of the projection may be determined based at least in part on the projection of the object 114 on the lateral motion boundary 110. Additionally, or alternatively, the width of the projection may represent a size of the object 114. Additionally, or alternatively, at operation 118, the process 100 may include determining a side association of the projection 122 of the object 114 on the lateral motion boundary 110. In some examples, the side association may correspond to the first side of the lateral motion boundary 110 and/or the second side of the lateral motion boundary 110.

An example 120 illustrates the projection 122 of the object 114 onto the lateral motion boundary 110. In some examples, the projection 122 may be sized a second width representing a size of the object 114.

As previously described, object(s) 114 may be projected onto the lateral motion boundary 110 according to various techniques. In some examples, an object 114 may be detected in the environment 106, on the roadway or proximal to the roadway (e.g., in a curbside parking zone), and a bounding box representing the object 114 may be determined and utilized for projection 122 onto the lateral motion boundary 110. For example, a vehicle 108 may be traversing an environment 106 on a substantially straight roadway, as illustrated in FIG. 1. In some examples, a width determined using the outermost edges of the bounding box may be projected back toward the vehicle 108 and onto the lateral motion boundary 110.

Additionally, or alternatively, while not illustrated in FIG. 1, a vehicle 108 may be traversing an environment 106 on a roadway having a curvature (e.g., a roadway having a turn). In some examples, the predicted future point may be along the curvature of the road, causing the configuration line to be unparallel with the vehicle 108, as described in more detail with respect to FIG. 4. Additionally, or alternatively, the predicted future point may be positioned along the trajectory 112 to a future position where the vehicle 108 may be proximal to the detected object, as described in more detail with respect to FIG. 3

The process(es) described herein for projecting an object 114 onto a lateral motion boundary 110 may be repeated any number of times for each object 114 in the environment 106 and/or within the bounds of the lateral motion boundary 110.

An operation 124, the process 100 may include modifying the lateral motion boundary 110 to determine a modified lateral motion boundary associated with the vehicle 108. In some examples, the modified lateral motion boundary may be sized smaller than the lateral motion boundary 110 (e.g., having less width). In some examples, modifying the lateral motion boundary 110 to determine the modified lateral motion boundary may be based at least in part on the second width of the projection 122 of the object 114. Additionally, or alternatively, modifying the lateral motion boundary 110 to determine the modified lateral motion boundary may be based at least in part on the side association associated with the projection 122 of the object 144.

An example 126 illustrates the vehicle 108 on the roadway of the environment 106 and the modified lateral motion boundary 128 of the vehicle. As illustrated, the modified lateral motion boundary 128 is sized a third width that is less than the first width of the lateral motion boundary 110. As can be seen in FIG. 1, the modified lateral motion boundary 128 may be determined by removing a portion of the lateral motion boundary 110 corresponding to at least the projection 122 of the object 114 in the environment 106.

A lateral boundary component associated with the vehicle 108 may determine a modified lateral motion boundary 128 in various ways based on projection(s) 122 of object(s) 114 onto the lateral motion boundary 110. For example, the lateral motion boundary 110 may be modified to determine a modified lateral motion boundary 128 having an open corridor (described in more detail with respect to FIGS. 2-4) configured such that the vehicle 108 may move laterally through the open corridor to follow a trajectory 112. For example, a vehicle 108 may be configured to deviate from an original trajectory 112 in a lateral direction that corresponds to the open corridor represented in the modified lateral motion boundary 128.

In some examples, a projection 122 of an object 114 may correspond to a particular side of the lateral motion boundary 110. For example, as illustrated in FIG. 1, a projection 122 may correspond to a first side of the lateral motion boundary that extends laterally from a first side (e.g., a traditional driver's side) of the vehicle 108. Additionally, or alternatively, while not represented in FIG. 1, a projection may correspond to a second side of the lateral motion boundary that extends laterally from a second side (e.g., a traditional passenger's side) of the vehicle 108, opposite the first side. In some examples, a projection 122 may correspond to only the first side, and as such, the lateral motion boundary 110 may be modified to determine a modified lateral motion boundary 128 by closing off the first side of lateral motion boundary 110 and configuring the second side as an open corridor of the modified lateral motion boundary 128. Additionally, or alternatively, a projection 122 may correspond to only the second side, and as such, the lateral boundary component may modify the lateral motion boundary 110 to determine a modified lateral motion boundary 128 by closing off the second side of the lateral motion boundary 110 and configuring the first side as an open corridor of the modified lateral motion boundary 128. For example, the lateral boundary component may truncate either side of the lateral motion boundary 110 by removing a portion between one of the endpoint(s) of the lateral motion boundary 110 and a point where the projection intersects the lateral motion boundary 110. Additionally, or alternatively, a projection 122 of an object 114 may correspond to both sides of the lateral motion boundary 110, as described in more detail with respect to FIG. 2.

At operation 130, the process 100 may include controlling the vehicle 108 based at least in part on the modified lateral motion boundary 128. For example, the modified lateral motion boundary 128 may be utilized to make determinations and/or control motion of the vehicle 108 in the environment 106.

An example 132 illustrates the vehicle 108 on the roadway of the environment 106 and the modified lateral motion boundary 128 of the vehicle 108. In some examples, the modified lateral motion boundary 128 may have a center line 134. In some examples, the center line 134 may be configured as a center of the modified lateral motion boundary 128 and may be shaped based on the geometry of the roadway. The vehicle 108 may be controlled using the modified lateral motion boundary 128 by causing the vehicle 108 to move laterally from the original trajectory 112 toward the center line 134 of the modified lateral motion boundary 128, represented by the modified trajectory 136.

In some examples, it may be determined that the open corridor of the modified lateral motion boundary 128 exceeds a threshold width associated with the vehicle 108 (e.g., a width comprising the width of the vehicle 108 and a safety margin) such that the vehicle 108 may pass through the open corridor. As previously described, the vehicle 108 may be controlled to move laterally (represented by the modified trajectory 136) from the original trajectory 112 to a center line 134 of the open corridor of the modified lateral motion boundary 128 while still following the general direction of the original trajectory 112. Additionally, or alternatively, it may be determined that the open corridor of the lateral motion boundary 128 does not exceed a threshold width associated with the vehicle 108 such that the vehicle 108 may not pass through the open corridor. In some examples, the vehicle 108 may be controlled to perform a safe stop operation and/or may be controlled using an algorithm and/or a model configured to plan an alternate route for traversing around the object(s) 114, such as, for example, one or more route planning algorithm(s), one or more trained models, and the like.

Additional data may be leveraged to make determinations for controlling the vehicle 108. For example, the vehicle 108 may determine whether a detected object 114 is an object 114 that is followable or unfollowable. In some examples, an object 114 may be classified as a followable object if the object 114 is traveling above a threshold speed (e.g., not stationary, having a speed within a threshold range of the roadway speed limit, and/or having a speed within a threshold range of the speed of the vehicle 108) and/or if the object has a yaw substantially similar to the yaw of the vehicle 108 (e.g., is traveling in the same direction of the vehicle 108). Additionally, or alternatively, an object 114 may be classified as an unfollowable object if the object 114 is traveling below a threshold speed (e.g., stationary, having a speed outside of a threshold range of the roadway speed limit, and/or having a speed outside of a threshold range of the speed of the vehicle 108) and/or if a yaw associated with the object 114 is outside of a threshold yaw range from a yaw associated with the vehicle 108 (e.g., is traveling in a different direction from the vehicle 108). If an object 114 is determined to be a followable object, the vehicle 108 may be controlled to follow the object 114. Additionally, or alternatively, if an object 114 is determined to be an unfollowable object, the vehicle 108 may move laterally around the object 114 according to the modified lateral motion boundary 128, as illustrated in FIG. 1, for example.

Figure 2:
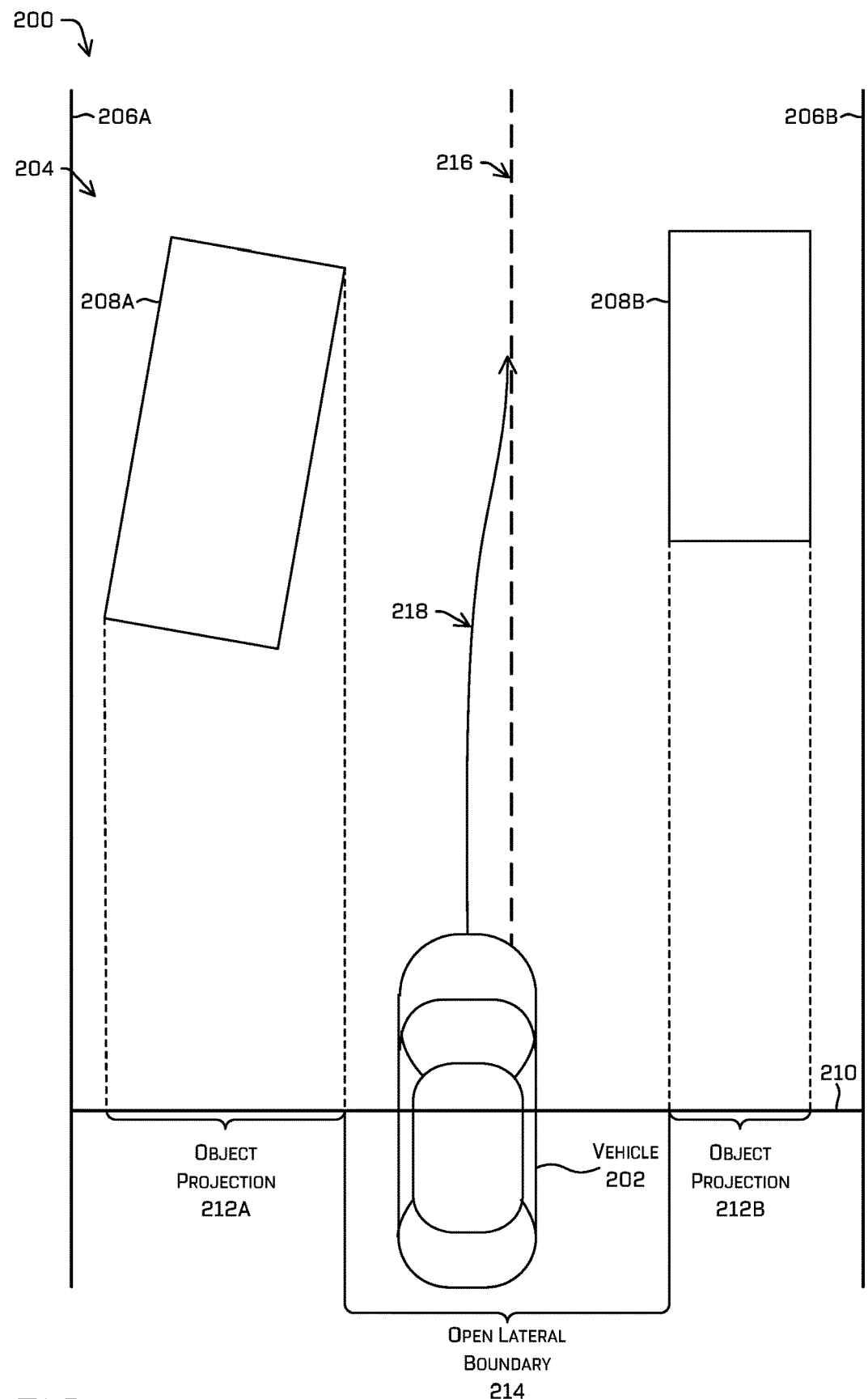
FIG. 2 depicts an example environment viewed from a top-down view and a lateral motion boundary associated with a vehicle in the environment.
Figure 3:
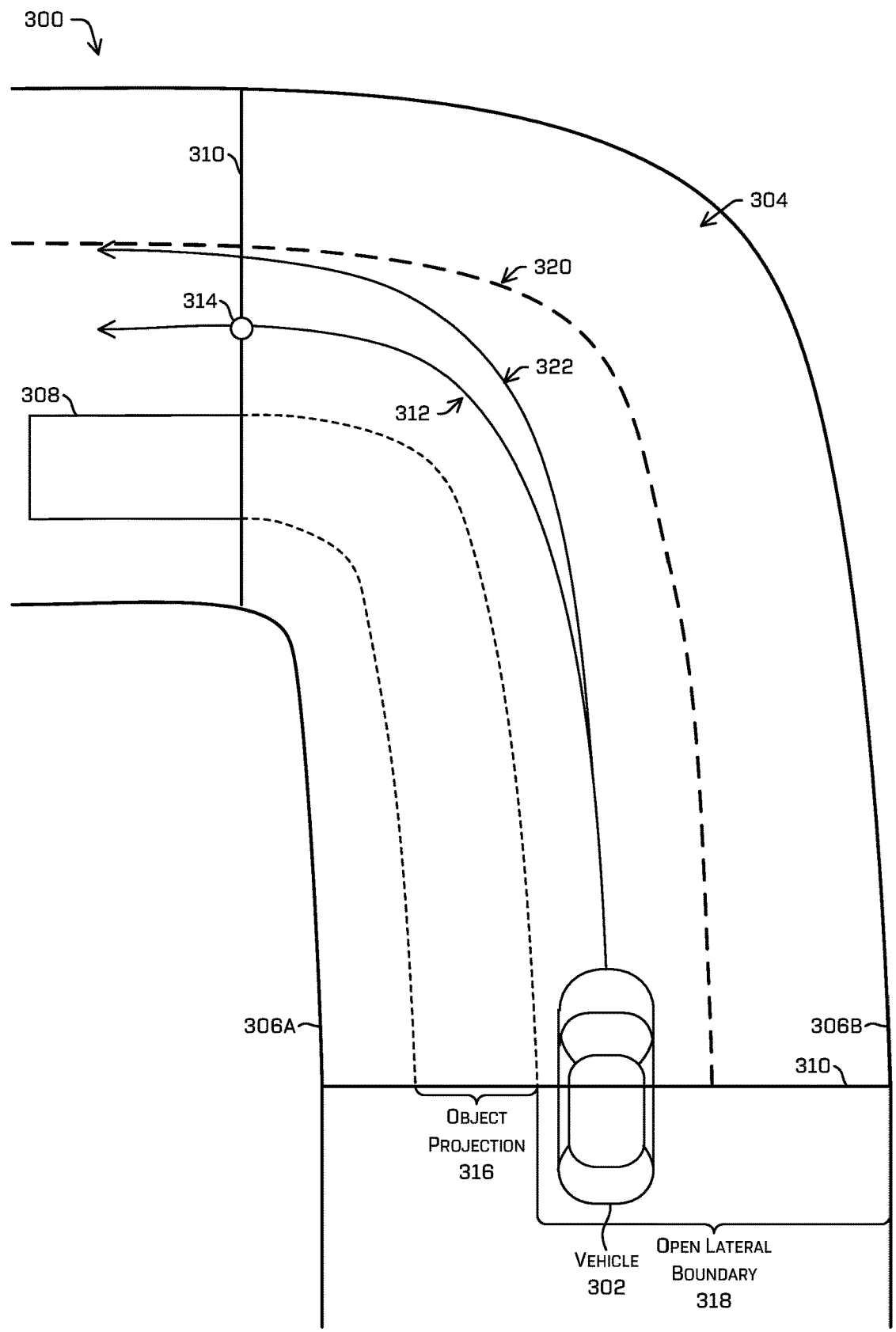
FIG. 3 depicts another example environment viewed from a top-down view and a lateral motion boundary associated with a vehicle in the environment.
Figure 4:
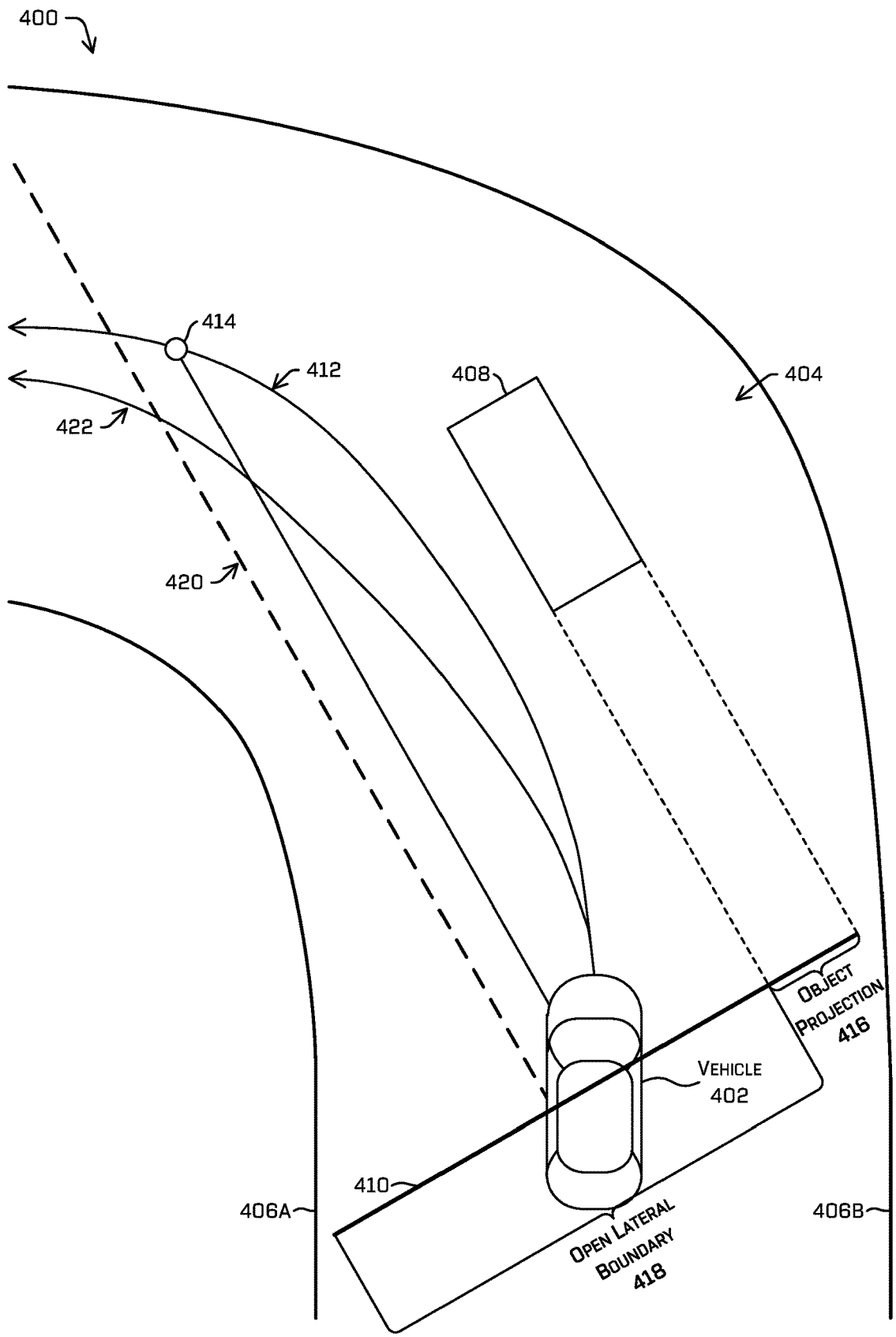
FIG. 4 depicts another example environment viewed from a top-down view and a lateral motion boundary associated with a vehicle in the environment.

FIGS. 2-4 depict example environment(s) 200-400 viewed from a top-down view and a lateral motion boundary associated with a vehicle in the environment. In some examples, the environment(s) 200-400 may be a physical environment and the vehicle may be an autonomous vehicle operating under the control of one or more autonomous vehicle control components, as described in more detail with respect to FIG. 6. Additionally, or alternatively, the environment(s) 200-400 may be a simulated environment and the vehicle may be a simulated vehicle, such as, for example, a smart agent operating in a driving simulation under the control of one or more simulation components, such as, for example, a smart agent controller.

FIG. 2 depicts an example environment 200 viewed from a top-down view including a vehicle 202 on a roadway 204. The roadway 204 may be partially defined by a first boundary 206A and/or a second boundary 206B, representing a width of the roadway 204. The environment 200 may also include a first object 208A and/or a second object 208B on the roadway 204. The vehicle 202 may include a lateral motion boundary 210 for traversing around the objects 208 on the roadway 204.

The lateral motion boundary 210 may be determined for the vehicle 202 based on various data associated with the environment 200. For example, the lateral motion boundary 210 may be sized corresponding to the geometry of the roadway 204 (e.g., a width defined by the bounds 206 of the roadway 204) and/or a lane of a roadway 204 on which the vehicle 202 is traversing. Additionally, or alternatively, the lateral motion boundary 210 may be configured to have a fixed size associated with the vehicle 202 and/or the environment 200. For example, in some open areas of the environment 200 (e.g., a parking lot) the lateral motion boundary 210 may be sized a fixed amount extending out laterally from the vehicle 202 on both sides.

The vehicle 202 may be configured to periodically make projections of object(s) 208 onto the lateral motion boundary 210 at future time horizons of the vehicle 202 in the environment 200, such as, for example, according to a time interval (e.g., once per second, twice per second, etc.). In some examples, object projection(s) 212 on the lateral motion boundary 210 may represent a size of corresponding object(s) 208 in the environment 200. For example, a first object 208A may be detected in the environment 200, and a bounding box representing the first object 208A may be determined and utilized to determine a first projection 212A onto the lateral motion boundary 210. Additionally, or alternatively, a second object 208B may be detected in the environment 200, and a second bounding box representing the second object 208B may be determined and utilized to determine a second projection 212B onto the lateral motion boundary 210. As illustrated, the object projections 212 may be sized by projecting the extreme edges of the corresponding bounding box representing the object 208 back onto the lateral motion boundary 210 to determine an intersection with the lateral motion boundary 210. For example, the first object projection 212A may be sized based on the bottom left corner and top right corner of the bounding box representing the first object 208A as they represent the overall blockage presented by the first object 208A. Additionally, or alternatively, the second object projection 212B may be sized based on the left side and the right side of the bounding box representing the second object 208B. An open lateral boundary 214 of the lateral motion boundary 210 may be determined using the object projections 212, as described in more detail below:

In some examples, a projection 212 of an object 208 may correspond to a particular side of the lateral motion boundary 210. For example, as illustrated in FIG. 2, the first object projection 212A may correspond to a first side of the lateral motion boundary 210 that extends laterally from a first side (e.g., a traditional driver's side) of the vehicle 202. Additionally, or alternatively, as illustrated in FIG. 2, the second object projection 212B may correspond to a second side of the lateral motion boundary 210 that extends laterally from a second side (e.g., a traditional passenger's side) of the vehicle 202, opposite the first side.

In some examples, a projection 212 may correspond to only the first side, and as such, the lateral motion boundary 210 may be modified by closing off the first side of the lateral motion boundary 210 and configuring the second side as the open lateral boundary 214 of the lateral motion boundary 210. Additionally, or alternatively, a projection 212 may correspond to only the second side, and as such, the lateral motion boundary 210 may be modified by closing off the second side of the lateral motion boundary 210 and configuring the first side as the open lateral boundary 214 of the lateral motion boundary 210.

Additionally, or alternatively, one or more projection(s) 212 of object(s) 208 may correspond to both sides of the lateral motion boundary 210. For example, the first object projection 212A may correspond to a portion of the first side of the lateral motion boundary 210 and the second object projection 212B may correspond to a portion of the second side of the lateral motion boundary 210. In such scenarios, the lateral motion boundary 210 may be modified by closing off a portion of the first side from the end of the first side (e.g., represented by the first roadway boundary 206A) and toward the vehicle 202 by at least an amount represented by the first object projection 212A and a portion of the second side from the end of the second side (e.g., represented by the second roadway boundary 206B) and toward the vehicle 202 by at least an amount represented by the second object projection 212B. As a result, the lateral motion boundary 210 may be modified to determine a modified lateral motion boundary 210 configured with an open lateral boundary 214 composed partly of the first side and/or second side in between the closed off portions of the lateral motion boundary 210.

The open lateral boundary 214 of the lateral motion boundary 210 may have a center line 216. In some examples, the center line 216 may be configured as a center of the open lateral boundary 214 and/or the modified lateral motion boundary and may be shaped based on the geometry of the roadway 204. The vehicle 202 may be controlled using the open lateral boundary 214 by causing the vehicle 202 to move laterally from an original trajectory toward the center line 216 of the open lateral boundary 214, represented by the trajectory 218.

FIG. 3 depicts another example environment 300 viewed from a top-down view including a vehicle 302 on a roadway 304. The roadway 304 may be partially defined by a first boundary 306A and/or a second boundary 306B, representing a width of the roadway 304. The environment 300 may also include an object 308 on the roadway 204. The vehicle 302 may include a lateral motion boundary 310 for traversing around the object 308 on the roadway 304.

The lateral motion boundary 310 may be determined for the vehicle 302 based on various data associated with the environment 300. For example, the lateral motion boundary 310 may be sized corresponding to the geometry of the roadway 304 (e.g., a width defined by the bounds 306 of the roadway 304) and/or a lane of a roadway 304 on which the vehicle 302 is traversing. Additionally, or alternatively, the lateral motion boundary 310 may be configured to have a fixed size associated with the vehicle 302 and/or the environment 300. For example, in some open areas of the environment 300 (e.g., a parking lot) the lateral motion boundary 310 may be sized a fixed amount extending out laterally from the vehicle 302 on both sides.

The vehicle 302 may be configured to periodically make projections of object(s) 308 onto the lateral motion boundary 310 at future time horizons of the vehicle 302 in the environment 300, such as, for example, according to a time interval (e.g., once per second, twice per second, etc.). As illustrated, the vehicle 302 may be traversing an environment 300 on a roadway 304 having a curvature (e.g., a roadway 304 having a turn). The vehicle 302 may receive and/or determine a curvature of the roadway 304 based on map data, road network data, and/or the like. In some examples, a trajectory 312 of the vehicle 302 may be utilized to determine a future point 314 along the trajectory 312. In some examples, a predicted future point 314 may be based on a period of time (e.g., a number of seconds into the future) and/or a distance (e.g., a fixed distance into the future based on a current velocity of the vehicle 302).

The predicted future point 314 may be positioned along the trajectory 312 to a future position where the vehicle 302 may be proximal to the detected object 308. In some examples, a predicted yaw of the vehicle 302 may be determined at the predicted future point 314. The lateral motion boundary 310 may be projected forward toward the object 308 along the trajectory 312 and to the predicted future point 314 where the lateral motion boundary 310 may be positioned to be substantially perpendicular to the predicted yaw of the vehicle 302, thus representing the lateral motion boundary 310 of the vehicle 302 at the predicted future point 314 on the trajectory 312. An object projection 316 having a width determined using the outermost edges of a bounding box associated with the detected object 308 may be projected onto the projected lateral motion boundary 310 to determine an intersection between the object projection 316 and the projected lateral motion boundary 310. In some examples, projection(s) 316 on the projected lateral motion boundary 310 may be replicated onto the lateral motion boundary 310 of the vehicle 302. An open lateral boundary 318 of the lateral motion boundary 310 may be determined using the object projection 316, as described in more detail below.

The open lateral boundary 318 of the lateral motion boundary 310 may have a center line 320. In some examples, the center line 320 may be configured as a center of the open lateral boundary 318 and/or the modified lateral motion boundary and may be shaped based on the geometry of the roadway 304, as illustrated in FIG. 3. The vehicle 302 may be controlled using the open lateral boundary 318 by causing the vehicle 302 to move laterally from the original trajectory 312 toward the center line 320 of the open lateral boundary 318 according to a new trajectory 322.

FIG. 4 depicts another example environment 400 viewed from a top-down view including a vehicle 402 on a roadway 404. The roadway 404 may be partially defined by a first boundary 406A and/or a second boundary 406B, representing a width of the roadway 404. The environment 400 may also include an object 408 on the roadway 404. The vehicle 402 may include a lateral motion boundary 410 for traversing around the object 408 on the roadway 404.

The lateral motion boundary 410 may be determined for the vehicle 402 based on various data associated with the environment 400. For example, the lateral motion boundary 410 may be sized corresponding to the geometry of the roadway 404 (e.g., a width defined by the bounds 406 of the roadway 404) and/or a lane of a roadway 404 on which the vehicle 402 is traversing. Additionally, or alternatively, the lateral motion boundary 410 may be configured to have a fixed size associated with the vehicle 402 and/or the environment 400. For example, in some open areas of the environment 400 (e.g., a parking lot) the lateral motion boundary 410 may be sized a fixed amount extending out laterally from the vehicle 402 on both sides.

The vehicle 402 may be configured to periodically make projections of object(s) 408 onto the lateral motion boundary 410 at future time horizons of the vehicle 402 in the environment 400, such as, for example, according to a time interval (e.g., once per second, twice per second, etc.). As illustrated, the vehicle 402 may be traversing an environment 400 on a roadway 404 having a curvature (e.g., a roadway 404 having a turn). The vehicle 402 may receive and/or determine a curvature of the roadway 404 based on map data, road network data, and/or the like. In some examples, a trajectory 412 of the vehicle 402 may be utilized to determine a future point 414 along the trajectory 412. In some examples, a predicted future point 414 may be based on a period of time (e.g., a number of seconds into the future) and/or a distance (e.g., a fixed distance into the future based on a current velocity of the vehicle 402). In some examples, a configuration line may be established between the predicted future point 414 and a point associated with the vehicle 402 (e.g., a central point of the vehicle 402) which may be utilized for positioning the lateral motion boundary 410. For example, the lateral motion boundary 410 may be configured to be substantially perpendicular to the configuration line, as illustrated in FIG. 4.

The predicted future point 414 may be along the curvature of the roadway 404, causing the configuration line to be unparallel with a yaw of the vehicle 402. In such scenarios, the lateral motion boundary 410 may be configured substantially perpendicular to the configuration line. For example, the lateral motion boundary 410 may be positioned based on a lateral deflection to the object 408. For example, an angle may be determined based on an axis that is parallel to a yaw of the vehicle at a current position of the vehicle 402, from the current position of the vehicle 402 and to the future point 414 (e.g., an angle forming between the lateral motion boundary 410 and the configuration line). In some examples, the lateral motion boundary may be configured to extend from the vehicle at an oblique angle corresponding (e.g., at a right angle to) to the angle from the current position to the future point. In some examples, the angle of the lateral motion boundary with respect to the vehicle can be determined using map data or a an angle or lateral offset to an object that may be projected ontol the laternal motion boundary, as disclosed herein. An object projection 416 having a width determined using the outermost edges of the bounding box associated with a detected object 408 may be projected back toward the vehicle 402 parallel to the configuration line and onto the lateral motion boundary 410 to determine an intersection between the object projection 416 and the lateral motion boundary 410. For example, an extent of the object 408 may be determined along an axis that is parallel to the lateral motion boundary 410, and the projection 416 of the object 408 may be based on the extent of the object 408 along the axis. An open lateral boundary 418 of the lateral motion boundary 410 may be determined using the object projection 416, as described in more detail below.

The open lateral boundary 418 of the lateral motion boundary 410 may have a center line 420. In some examples, the center line 420 may be configured as a center of the open lateral boundary 418 and/or the modified lateral motion boundary and may be parallel to the configuration line, as illustrated in FIG. 4. The vehicle 402 may be controlled using the open lateral boundary 418 by causing the vehicle 402 to move laterally from the original trajectory 412 toward the center line 420 of the open lateral boundary 418 according to a new trajectory 422.

Figure 5:
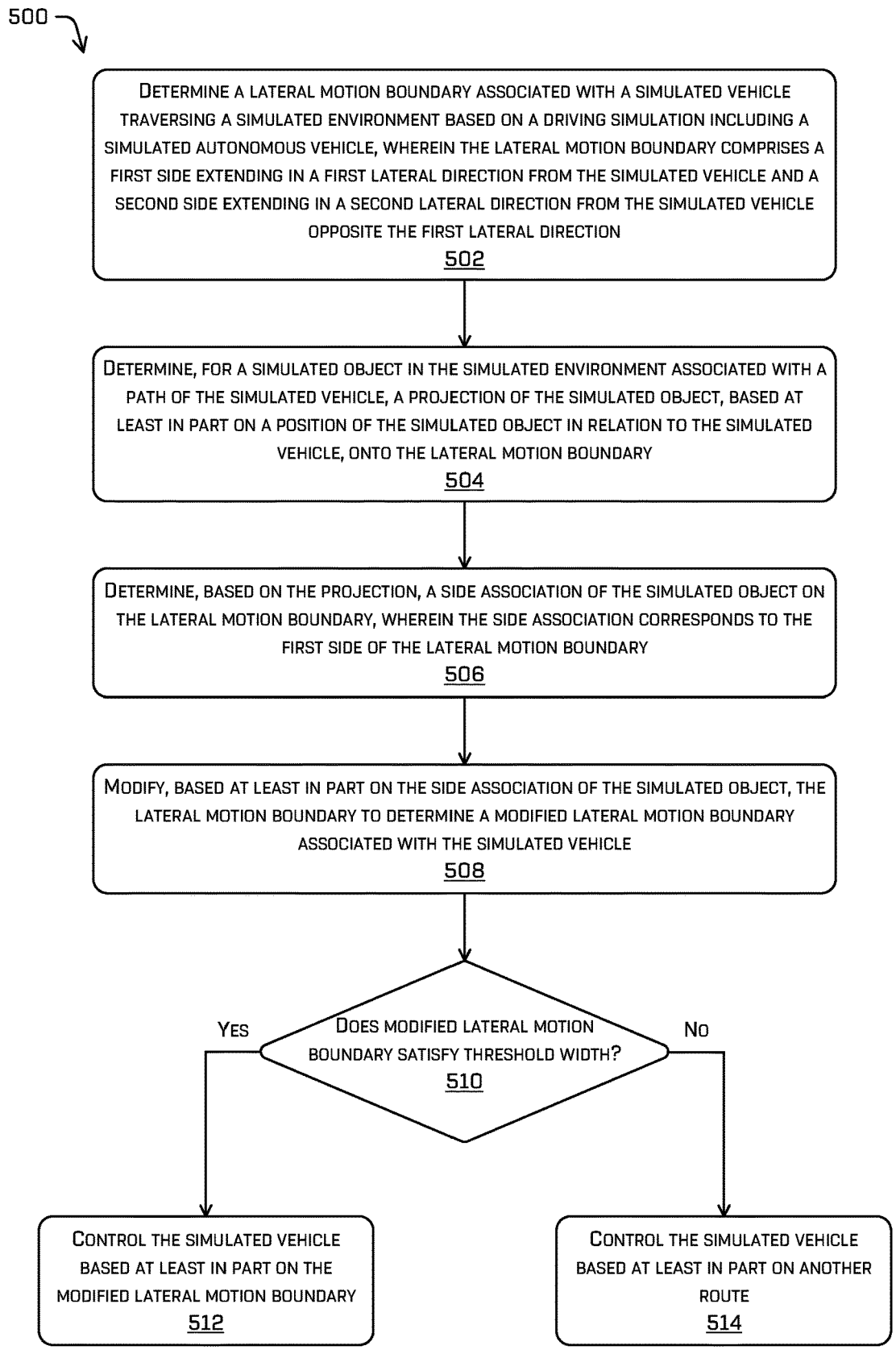
FIG. 5 is an example process for determining a lateral motion boundary of a vehicle in an environment, determining a projection of an object in the environment onto the lateral motion boundary, determining a side association of the projection on the lateral motion boundary, modifying the lateral motion boundary to determine a modified lateral motion boundary, and controlling the vehicle using the modified lateral motion boundary.

FIGS. 1 and 5 illustrate example processes in accordance with examples of the disclosure. These processes are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes. For example, some or all of the processes 100 and/or 500 may be performed by one or more components in FIG. 6, as described herein. For example, some or all of the processes 100 and/or 500 may be performed by the lateral boundary component 640, the projection component 642, and/or the simulation component 644.

FIG. 5 is an example process 500 for determining a lateral motion boundary of a vehicle in an environment, determining a projection of an object in the environment onto the lateral motion boundary, determining a side association of the projection on the lateral motion boundary, modifying the lateral motion boundary to determine a modified lateral motion boundary, and controlling the vehicle using the modified lateral motion boundary.

The process 500 begins at operation 502 and includes determining a lateral motion boundary associated with a vehicle in an environment. In some examples, the lateral motion boundary may comprise a first side extending in a first lateral direction from the vehicle and/or a second side extending in a second lateral direction from the vehicle opposite the first lateral direction. In some examples, the vehicle and/or the lateral motion boundary may be configured as the vehicle 108 and/or the lateral motion boundary 110 as described with respect to FIG. 1.

At operation 504, the process 500 may include determining, for an object in the environment, a projection of the object onto the lateral motion boundary. In some examples, a projection of the object may be determined by the projection component 642 as described with respect to FIG. 6 and may employ any of the techniques for determining a projection as described herein with respect to FIGS. 1-4. In some examples, the object and/or the projection may be configured as the object 114 and/or the projection 122 as described with respect to FIG. 1.

At operation 506, the process 500 may include determining a side association of the object on the lateral motion boundary. In some examples, determining the side association of the object may be based at least in part on the projection. Additionally, or alternatively, the side association may correspond to the first side of the lateral motion boundary and/or the second side of the lateral motion boundary.

At operation 508, the process 500 may include modifying the lateral motion boundary to determine a modified lateral motion boundary associated with the vehicle. In some examples, the lateral motion boundary may be modified based at least in part on the side association of the object and/or a width representing a size of the object. In some examples, the lateral motion boundary may be modified by the lateral boundary component 640 as described with respect to FIG. 6.

At operation 510, the process 500 may include determining whether the modified lateral motion boundary satisfies a threshold width. By way of example, the operation 510 may include determining that the modified lateral motion boundary does satisfy the threshold width (e.g., a width of the modified lateral motion boundary is equal to or exceeds a threshold width). The process 500 may then subsequently include the operation 512, based on determining that the modified lateral motion boundary does satisfy the threshold width. By way of another example, the operation 510 may include determining that the modified lateral motion boundary does not satisfy the threshold width (e.g., a width of the modified lateral motion boundary is less than a threshold width). The process 500 may then subsequently include the operation 514, based on determining that the modified lateral motion boundary does not satisfy the threshold width.

At operation 512, the process 500 may include controlling the vehicle based at least in part on the modified lateral motion boundary. In some examples, controlling the vehicle based at least in part on the modified lateral motion boundary may comprise causing a vehicle to move laterally from a trajectory of the vehicle to a center line of an open lateral boundary of the modified lateral motion boundary.

At operation 514, the process 500 may include causing the vehicle to perform a safe stop operation and/or controlling the vehicle based at least in part on an algorithm and/or a model, such as, for example, one or more route planning algorithm(s), one or more trained models, and the like. In some examples, the trained model may control a vehicle and/or a simulated vehicle using one or more computing devices storing at least one of one or more trained model(s), a localization component, a perception component, a planning component, a map component, and/or a controller component.

Figure 6:
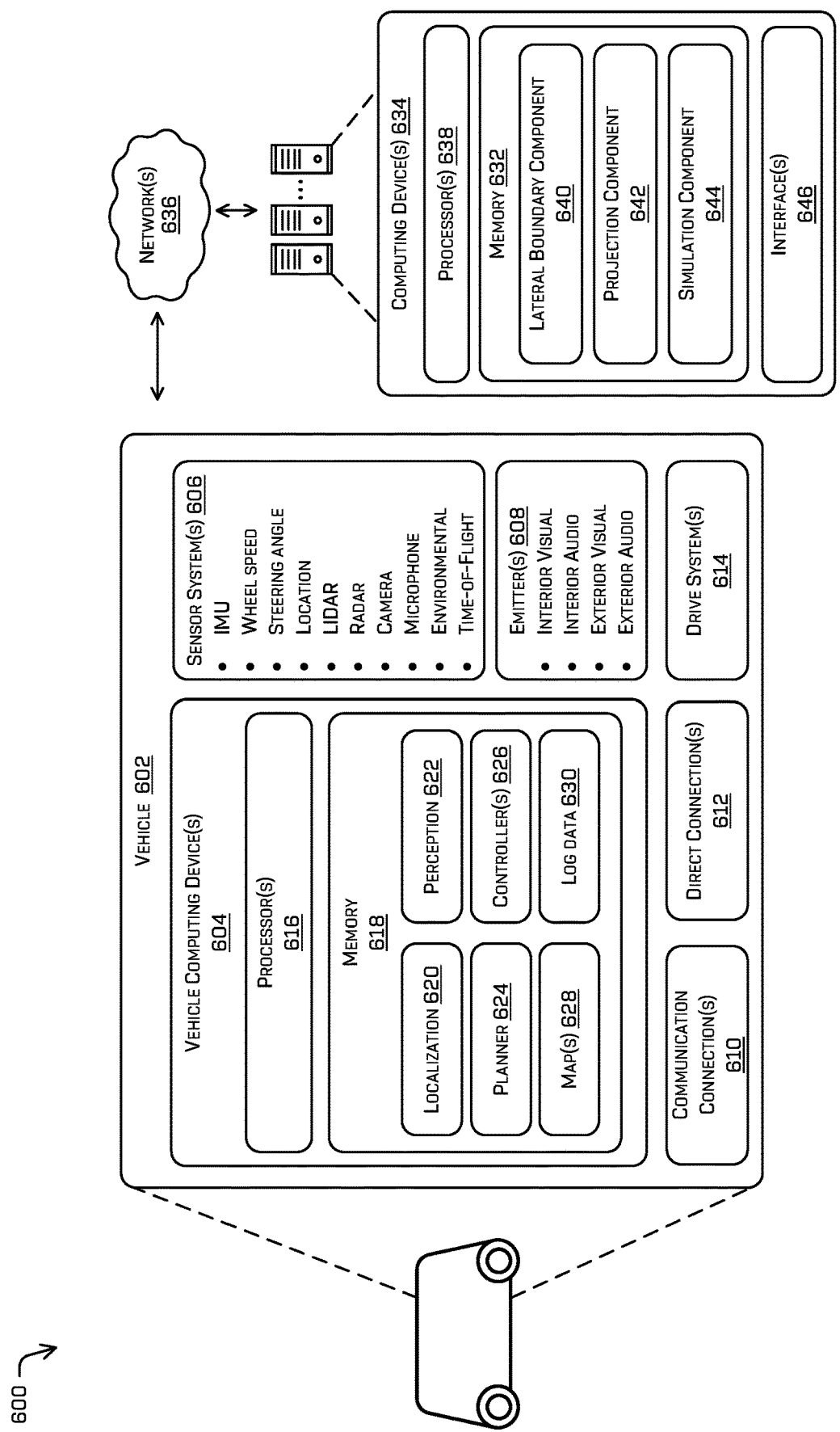
FIG. 6 is a block diagram of an example system for implementing the techniques described herein.

FIG. 6 is a block diagram of an example system 600 for implementing the techniques described herein. In at least one example, the system 600 may include a vehicle 602, such as vehicle 108.

The vehicle 602 may include a vehicle computing device 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the one or more processors 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In the illustrated example, the memory 618 of the vehicle computing device 604 stores a localization component 620, such as localization component 620, a perception component 622, a planner component 624, one or more system controllers 626, one or more maps 628, and log data 630. Though depicted in FIG. 6 as residing in the memory 618 for illustrative purposes, it is contemplated that the localization component 620, the perception component 622, the planner component 624, the system controller(s) 626, and the map(s) 628 may additionally, or alternatively, be accessible to the vehicle 602 (e.g., stored on, or otherwise accessible by, memory remote from the vehicle 602, such as, for example, on memory 632 of a computing device 634). As described herein, the localization component 620, the perception component 622, the planner component 624, and the system controller(s) 626 may collectively comprise a vehicle controller.

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a path polygon associated with the vehicle path, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.).

In additional or alternative examples, the perception component 622 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planner component 624 may determine a path for the vehicle 602 to follow to traverse through an environment. For example, the planner component 624 may determine various routes and trajectories and various levels of detail. For example, the planner component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 624 may generate an instruction for guiding the vehicle 602 along at least a portion of the route from the first location to the second location. In at least one example, the planner component 624 may determine how to guide the vehicle 602 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In at least one example, the vehicle computing device(s) 604 may include one or more system controllers 626, which may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include one or more maps 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the maps 628. That is, the maps 628 may be used in connection with the localization component 620, the perception component 622, and/or the planner component 624 to determine a location of the vehicle 602, detect objects in an environment, and/or generate routes and/or trajectories to navigate within an environment. Additionally, in some examples, the maps 628 may be used in connection with a tracker component to determine a position and/or orientation of the vehicle with respect to a planned trajectory, such as based on steering angles, velocities, accelerations, drive direction, drive gear, and/or gravity acceleration.

In some examples, the one or more maps 628 may be stored on a computing device(s) (such as the computing device(s) 634) accessible via network(s) 636. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

As illustrated in FIG. 6, the memory 618 may store log data 630. The log data 630 may represent data input and/or output by each of the localization component 620, the perception component 622, the planner component 624, the controller(s) 626, and/or outputs of various subcomponents thereof. In at least one example the log data 630 may include sensor data captured and provided to one or more of the components of the vehicle computing device(s) 604 by the sensor systems 606.

As can be understood, the components discussed herein (e.g., the localization component 620, the perception component 622, the planner component 624, the one or more system controllers 626, and the one or more maps 628 are described as divided for illustrative purposes. However, the operations performed by the various components may be combined or performed in any other component. For example, in the illustrative example, the functions of a tracker component as described above may be performed by the planner component 624. However, in other examples, the tracker component may include a separate component independent of the planner component 624.

In some instances, aspects of some or all of the components discussed herein may include any models, techniques, and/or machine learning techniques. For example, in some instances, the components in the memory 618 (and the memory 632, discussed below) may be implemented as a neural network.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally, or alternatively, the sensor system(s) 606 may send sensor data, via the one or more networks 636, to the one or more computing device(s) 634 at a particular frequency, after a lapse of a predetermined period of time, in near real-time, etc.

The vehicle 602 may also include one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device(s) 634, other nearby vehicles, etc.) and/or one or more remote sensor system(s) for receiving sensor data.

The communications connection(s) 610 may include physical and/or logical interfaces for connecting the vehicle computing device 604 to another computing device or a network, such as network(s) 636. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration associated with the drive systems, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle 602. In some instances, the direct connection 612 may further releasably secure the drive system(s) 614 to the body of the vehicle 602.

In at least one example, the localization component 620, the perception component 622, the planner component 624, and/or the one or more system controllers 626, and/or various components thereof, may process sensor data, as described above, and may send their respective outputs as log data 630, over the one or more network(s) 636, to the computing device(s) 634. In at least one example, the vehicle computing device(s) 604 may send the log data 630 to the computing device(s) 634 at a particular frequency, after a lapse of a predetermined period of time, in near real-time, etc.

In some examples, the vehicle 602 may send sensor data to the computing device(s) 634 via the network(s) 636. In some examples, the vehicle 602 may receive sensor data from the computing device(s) 634 via the network(s) 636. The sensor data may include raw sensor data and/or processed sensor data and/or representations of sensor data. In some examples, the sensor data (raw or processed) may be sent and/or received as one or more log files.

The computing device(s) 634 may include processor(s) 638 and a memory 632 storing a lateral boundary component 640, a projection component 642, and/or a simulation component 644.

The lateral boundary component 640 may be configured to determine a lateral motion boundary of a vehicle in an environment. In some examples, the lateral motion boundary may include a first side extending in a first substantially lateral direction from the vehicle and/or a second side opposite the first side and extending in a second substantially lateral direction from the vehicle. In some examples, the lateral boundary component 640 may determine a lateral motion boundary for the vehicle based on various data associated with the environment. For example, the lateral motion boundary may be sized corresponding to the geometry of a roadway (e.g., a width of a roadway) and/or a lane of a roadway on which the vehicle is traversing. Additionally, or alternatively, the lateral boundary component 640 may be configured to determine a lateral motion boundary having a fixed size associated with a vehicle and/or the environment. For example, in some open areas of the environment (e.g., a parking lot) the lateral motion boundary may be sized a fixed amount extending out laterally from the vehicle on both sides.

Additionally, or alternatively, the lateral boundary component 640 may be configured to modify a lateral motion boundary to determine a modified lateral motion boundary having an open lateral boundary. In some examples, the modified lateral motion boundary may include a first side extending in a first substantially lateral direction from the vehicle and/or a second side opposite the first side and extending in a second substantially lateral direction from the vehicle. In some examples, the modified lateral motion boundary may be sized smaller than the lateral motion boundary (e.g., having less width). In some examples, modifying the lateral motion boundary to determine the modified lateral motion boundary may be based at least in part on a width of one or more projection(s) of object(s) in the environment. Additionally, or alternatively, the lateral boundary component 640 may be configured to modify the lateral motion boundary to determine the modified lateral motion boundary based at least in part on the side association associated with a projection of an object in the environment. Additionally, or alternatively, the lateral boundary component 640 may configured the modified lateral motion boundary to include an open lateral boundary for passage by a vehicle in the environment.

In some examples, the lateral boundary component 640 may be configured to determine a lateral motion boundary and/or a modified lateral motion boundary in association with a vehicle, such as, for example, and autonomous vehicle traversing a physical environment. Additionally, or alternatively, the lateral boundary component 640 may be configured to determine a lateral motion boundary and/or a modified lateral motion boundary in association with a simulated vehicle, such as, for example, a smart agent traversing a simulated environment during the execution of a driving simulation.

The projection component 642 may be configured to determine projections of objects in an environment onto a lateral motion boundary of a vehicle. For example, the projection component 642 may be configured to periodically make projections of object(s) onto a lateral motion boundary at future time horizons of a vehicle in an environment, such as, for example, according to a time interval (e.g., once per second, twice per second, etc.). In some examples, the projection component 642 may determine a future point along a trajectory of a vehicle. In some examples, a predicted future point may be based on a period of time (e.g., a number of seconds into the future) and/or a distance (e.g., a fixed distance into the future based on a current velocity of the vehicle). In some examples, the projection component 642 may determine a configuration line between the predicted future point and a point associated with a vehicle (e.g., a central point of the vehicle) which may be utilized for positioning the lateral motion boundary and/or projections onto the lateral motion boundary. For example, a lateral motion boundary may be configured to be substantially perpendicular to the configuration line, thus aligning the lateral motion boundary substantially parallel to a yaw of a vehicle at a given future point in time.

In some examples, the projection component 642 may be configured to determine projections onto the lateral motion boundary of a vehicle, such as an autonomous vehicle traversing a physical environment, where the vehicle may include one or more sensors configured to capture sensor data as the vehicle traverses an environment. In some examples, the projection component 642 may determine object detections and/or projections by leveraging the sensor data in various ways. In some examples, the projection component 642 may utilize a variety of sensor data to determine the object detections, such as, for example, lidar data, radar data, time-of-flight data, or any other depth data. In some examples, the sensor data may be utilized by the projection component 642 to determine projection data representing the width of an object in the physical environment on a lateral motion boundary of a vehicle.

Additionally, or alternatively, the projection component 642 may be configured to determine projections onto the lateral motion boundary of a simulated vehicle, such as a smart agent executing in a simulated environment of a driving simulation, where the simulated vehicle may traverse the simulated environment according to a route (e.g., a trajectory) and/or based on log data associated with the driving simulation. The simulated vehicle may include one or more simulated sensors configured to capture simulated sensor data as the simulated vehicle traverses a simulated environment. In some examples, the simulated sensor data may be configured similar to the sensor data captured by the autonomous vehicle 108 traversing the physical environment, as previously described. Additionally, or alternatively, the projection component 642 may utilize the simulated sensor data to determine projection data representing the width of a simulated object in the simulated environment on a lateral motion boundary of a vehicle.

The projection component 642 may also be configured to determine a width of a projection on a lateral motion boundary. In some examples, the width of the projection may be determined based at least in part on the projection of the object on the lateral motion boundary. Additionally, or alternatively, the width of the projection may represent a size of the object. Additionally, or alternatively, the projection component 642 may be configured to determine a side association of the projection of the object on the lateral motion boundary. In some examples, the side association may correspond to the first side of the lateral motion boundary and/or the second side of the lateral motion boundary.

The projection component 642 may be configured to project object(s) onto the lateral motion boundary according to various techniques. In some examples, an object may be detected in the environment, on the roadway or proximal to the roadway (e.g., in a curbside parking zone), and the projection component 642 may determine a bounding box representing the object for projection onto the lateral motion boundary. For example, a vehicle may be traversing an environment on a substantially straight roadway, and the projection component 642 may determine a width using the outermost edges of the bounding box, which may be projected back toward the vehicle and onto the lateral motion boundary. Additionally, or alternatively, a vehicle may be traversing an environment on a roadway having a curvature (e.g., a roadway having a turn), and the projection component 642 may determine object projections of objects around the curve using any of the techniques described with respect to FIGS. 1, 3, and 4.

The simulation component 644 may be configured to execute a driving simulation as a set of simulation instructions and generate simulation data. In some instances, the simulation component 644 may execute multiple driving simulations simultaneously and/or in parallel. This may allow a user to edit a driving simulation and execute permutations of the driving simulation with variations between each driving simulation. The simulation component 644 may be communicatively coupled to at least the lateral boundary component 640 and/or the projection component 642 and configured to implement the various techniques described herein in the context of a driving simulation.

In various examples, the computing device(s) 634 may include one or more input/output (I/O) devices, such as via one or more interfaces 646. The interface(s) 646 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In such examples, the interface(s) 646 may include one or more displays. Depending on the type of computing device, such as a user computing device, server computing device, or the like, the display may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a graphical user interface presented on the display. Accordingly, examples herein are not limited to any particular display technology.

The processor(s) 616 of the vehicle 602 and the processor(s) 638 of the computing device(s) 634 may be any suitable processor capable of executing instructions to process data and perform operations as described herein. By way of example and not limitation, the processor(s) 616 and 638 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 618 and 632 are examples of non-transitory computer-readable media. The memory 618 and 632 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 618 and 632 can be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

EXAMPLE CLAUSES

A. A system comprising: one or more processors; and one or more non-transitory computer-readable media storing instructions executable by one or more processors, wherein the instructions, when executed, cause the system to perform operations comprising: determining a lateral motion boundary associated with a simulated vehicle traversing a simulated environment based on a driving simulation including a simulated autonomous vehicle that is different from the simulated vehicle, wherein the lateral motion boundary comprises a first side extending in a first lateral direction from the simulated vehicle and a second side extending in a second lateral direction from the simulated vehicle opposite the first lateral direction; determining, for a simulated object in the simulated environment associated with a path of the simulated vehicle, a projection of the simulated object, based at least in part on a position of the simulated object in relation to the simulated vehicle, onto the lateral motion boundary; determining, based at least in part on the projection, a side association of the simulated object on the lateral motion boundary, wherein the side association corresponds to the first side of the lateral motion boundary; modifying, based at least in part on the side association of the simulated object, the lateral motion boundary to determine a modified lateral motion boundary associated with the simulated vehicle; and controlling the simulated vehicle based at least in part on the modified lateral motion boundary.

B. The system of paragraph A, the operations further comprising: receiving log data associated with the simulated object; determining, based at least in part on the log data, a yaw associated with the simulated object and a movement state associated with the simulated object; determining, based at least in part on the yaw and the movement state, a classification associated with the simulated object, the classification indicating that the simulated object is one of a followable simulated object or an unfollowable simulated object; and wherein controlling the simulated vehicle comprises, based at least in part on the classification, at least one of: causing the simulated vehicle to traverse the simulated environment within the projection of the simulated object; or causing the simulated vehicle to move laterally outside of the projection of the simulated object.

C. The system of paragraph B, the operations further comprising: determining that the classification associated with the simulated object indicates that the object is an unfollowable simulated object; projecting the simulated object onto the lateral motion boundary to determine an intersection between the simulated object and the lateral motion boundary; and wherein determining the projection of the simulated object onto the lateral motion boundary is based at least in part on the intersection.

D. The system of any one of paragraphs A-C, the operations further comprising: projecting the lateral motion boundary to a future position along the path of the simulated vehicle to determine an intersection between the simulated object and the lateral motion boundary; and wherein determining the projection of the simulated object onto the lateral motion boundary is based at least in part on the intersection.

E. The system of any one of paragraphs A-D, the operations further comprising: determining an angle from a current position of the vehicle on a first axis parallel to a yaw associated with the vehicle and to a future position along the path of the simulated vehicle, wherein the first side of the lateral motion boundary extends from the simulated vehicle at an oblique angle corresponding to the angle; determining an extent of the simulated object along a second axis parallel to the lateral motion boundary; and wherein determining the projection of the simulated object is based at least in part on the extent of the simulated object.

F. The system of any one of paragraphs A-E, the operations further comprising: determining that a first width associated with the modified lateral motion boundary is greater than a second width representing a width of the simulated vehicle and a safety margin associated with the simulated vehicle; and wherein controlling the vehicle comprises causing the simulated vehicle to follow a trajectory along a center of the modified lateral motion boundary.

G. The system of any one of paragraphs A-F, the operations further comprising: determining that a first width associated with the modified lateral motion boundary is less than a second width representing a width of the simulated vehicle and a safety margin associated with the vehicle, wherein controlling the simulated vehicle includes at least one of: causing the simulated vehicle to perform a safe stop operation; or controlling the simulated vehicle based at least in part on a route model.

H. A method comprising: determining a lateral motion boundary associated with a vehicle in an environment, the lateral motion boundary having a first width; determining, for an object in the environment, a projection of the object onto the lateral motion boundary; modifying, based at least in part on a width associated with the object, the lateral motion boundary to determine a modified lateral motion boundary associated with the vehicle, the modified lateral motion boundary having a second width that is less than the first width; and controlling the vehicle based at least in part on the modified lateral motion boundary.

I. The method of paragraph H, further comprising: receiving log data associated with the object; determining, based at least in part on the log data, a yaw associated with the object and a movement state associated with the object; determining, based at least in part on the yaw and the movement state, a classification associated with the object, the classification indicating that the object is one of a followable object or an unfollowable object; and wherein controlling the vehicle comprises, based at least in part on the classification, at least one of: causing the vehicle to traverse the environment within the projection of the object; or causing the vehicle to move laterally outside of the projection of the object.

J. The method of paragraph I, further comprising: determining, based at least in part on the classification associated with the object, that the object is an unfollowable object; projecting the object onto the lateral motion boundary to determine an intersection between the object and the lateral motion boundary; and determining the width associated with the object based at least in part on the intersection.

K. The method of any one of paragraphs H-J, further comprising: projecting the lateral motion boundary to a future position along a path of the vehicle to determine an intersection between the object and the lateral motion boundary; and determining the width associated with the object based at least in part on the intersection.

L. The method of any one of paragraphs H-K, further comprising: determining that the second width associated with the modified lateral motion boundary is greater than a third width representing a width of the vehicle and a safety margin associated with the vehicle; and wherein controlling the vehicle comprises causing the vehicle to follow a trajectory along a center of the modified lateral motion boundary.

M. The method of any one of paragraphs H-L, further comprising: determining that the second width associated with the modified lateral motion boundary is less than a third width representing a width of the vehicle and a safety margin associated with the vehicle, wherein controlling the vehicle includes at least one of: causing the vehicle to perform a safe stop operation; or determining a route for the vehicle to follow using a method other than the method of claim 8.

N. The method of any one of paragraphs H-M, further comprising determining the first width associated with the lateral motion boundary based at least in part on at least one of a third width of a roadway that the vehicle is traversing in the environment or a fourth width of a lane of the roadway.

O. One or more non-transitory computer-readable media storing instructions executable by a processors, wherein the instructions, when executed, cause the processor to perform operations comprising: determining a lateral motion boundary associated with a simulated vehicle in a simulated environment of a driving simulation including a simulated autonomous vehicle that is different from the simulated vehicle, the lateral motion boundary having a first width; determining, for a simulated object in the simulated environment, a projection of the simulated object onto the lateral motion boundary; modifying, based at least in part on a width associated with the simulated object, the lateral motion boundary to determine a modified lateral motion boundary associated with the simulated vehicle, the modified lateral motion boundary having a second width that is less than the first width; and controlling the simulated vehicle based at least in part on the modified lateral motion boundary.

P. The one or more non-transitory computer-readable media of paragraph O, the operations further comprising: receiving log data associated with the simulated object; determining, based at least in part on the log data, a yaw associated with the simulated object and a movement state associated with the simulated object; determining, based at least in part on the yaw and the movement state, a classification associated with the simulated object, the classification indicating that the simulated object is one of a followable simulated object or an unfollowable simulated object; and wherein controlling the simulated vehicle comprises, based at least in part on the classification, at least one of: causing the simulated vehicle to traverse the simulated environment within the projection of the simulated object; or causing the simulated vehicle to move laterally outside of the projection of the simulated object.

Q. The one or more non-transitory computer-readable media of paragraph P, the operations further comprising: determining, based at least in part on the classification associated with the object, that the object is an unfollowable object; projecting the simulated object onto the lateral motion boundary to determine an intersection between the simulated object and the lateral motion boundary; and determining the width associated with the simulated object based at least in part on the intersection.

R. The one or more non-transitory computer-readable media of any one of paragraphs O-Q, the operations further comprising: projecting the lateral motion boundary to a future position along a path of the simulated vehicle to determine an intersection between the simulated object and the lateral motion boundary; and determining the width associated with the simulated object based at least in part on the intersection.

S. The one or more non-transitory computer-readable media of any one of paragraphs O-R, the operations further comprising: determining that the second width associated with the modified lateral motion boundary is greater than a third width representing a width of the simulated vehicle and a safety margin associated with the simulated vehicle; and wherein controlling the simulated vehicle comprises causing the simulated vehicle to follow a trajectory along a center of the modified lateral motion boundary.

T. The one or more non-transitory computer-readable media of any one of paragraphs O-S, the operations further comprising: determining that the second width associated with the modified lateral motion boundary is less than a third width representing a width of the simulated vehicle and a safety margin associated with the simulated vehicle, wherein controlling the simulated vehicle includes at least one of: causing the simulated vehicle to perform a safe stop operation; or controlling the simulated vehicle based at least in part on a trained model.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by one or more processors, wherein the instructions, when executed, cause the system to perform operations comprising:
determining a lateral motion boundary associated with a simulated vehicle traversing a simulated environment based on a driving simulation including a simulated autonomous vehicle that is different from the simulated vehicle, wherein the lateral motion boundary comprises a first side extending in a first lateral direction from the simulated vehicle and a second side extending in a second lateral direction from the simulated vehicle opposite the first lateral direction;
determining, for a simulated object in the simulated environment associated with a path of the simulated vehicle, a projection of the simulated object, based at least in part on a position of the simulated object in relation to the simulated vehicle, onto the lateral motion boundary;
determining, based at least in part on the projection, a side association of the simulated object on the lateral motion boundary, wherein the side association corresponds to the first side of the lateral motion boundary;
modifying, based at least in part on the side association of the simulated object, the lateral motion boundary to determine a modified lateral motion boundary associated with the simulated vehicle;
determining that the modified lateral motion boundary satisfies a threshold width; and
controlling the simulated vehicle based at least in part on the modified lateral motion boundary satisfying the threshold width.

2. The system of claim 1, the operations further comprising:
receiving log data associated with the simulated object;
determining, based at least in part on the log data, a yaw associated with the simulated object and a movement state associated with the simulated object;
determining, based at least in part on the yaw and the movement state, a classification associated with the simulated object, the classification indicating that the simulated object is one of a followable simulated object or an unfollowable simulated object; and
wherein controlling the simulated vehicle comprises, based at least in part on the classification, at least one of:
causing the simulated vehicle to traverse the simulated environment within the projection of the simulated object; or
causing the simulated vehicle to move laterally outside of the projection of the simulated object.

3. The system of claim 2, the operations further comprising:
determining that the classification associated with the simulated object indicates that the simulated object is the unfollowable simulated object;
projecting the simulated object onto the lateral motion boundary to determine an intersection between the simulated object and the lateral motion boundary; and
wherein determining the projection of the simulated object onto the lateral motion boundary is based at least in part on the intersection.

4. The system of claim 1, the operations further comprising:
projecting the lateral motion boundary to a future position along the path of the simulated vehicle to determine an intersection between the simulated object and the lateral motion boundary; and
wherein determining the projection of the simulated object onto the lateral motion boundary is based at least in part on the intersection.

5. The system of claim 1, the operations further comprising:
determining an angle from a current position of the simulated vehicle on a first axis parallel to a yaw associated with the simulated vehicle and to a future position along the path of the simulated vehicle, wherein the first side of the lateral motion boundary extends from the simulated vehicle at an oblique angle corresponding to the angle;
determining an extent of the simulated object along a second axis parallel to the lateral motion boundary; and
wherein determining the projection of the simulated object is based at least in part on the extent of the simulated object.

6. The system of claim 1, the operations further comprising:
- determining that a first width associated with the modified lateral motion boundary is greater than a second width representing a width of the simulated vehicle and a safety margin associated with the simulated vehicle; and
- wherein controlling the simulated vehicle comprises causing the simulated vehicle to follow a trajectory along a center of the modified lateral motion boundary.

7. The system of claim 1, the operations further comprising:
- determining that a first width associated with the modified lateral motion boundary is less than a second width representing a width of the simulated vehicle and a safety margin associated with the simulated vehicle, wherein controlling the simulated vehicle includes at least one of:
  - causing the simulated vehicle to perform a safe stop operation; or
  - controlling the simulated vehicle based at least in part on a route model.

8. A method comprising:
- determining a lateral motion boundary associated with a vehicle in an environment, the lateral motion boundary having a first width;
- determining, for an object in the environment, a projection of the object onto the lateral motion boundary;
- modifying, based at least in part on a width associated with the object, the lateral motion boundary to determine a modified lateral motion boundary associated with the vehicle, the modified lateral motion boundary having a second width that is less than the first width; and
- controlling the vehicle based at least in part on the modified lateral motion boundary, wherein controlling the vehicle based at least in part on the modified lateral motion boundary comprises causing the vehicle to move laterally from a trajectory of the vehicle to a center line of an open lateral boundary of the modified lateral motion boundary.

9. The method of claim 8, further comprising:
- receiving log data associated with the object;
- determining, based at least in part on the log data, a yaw associated with the object and a movement state associated with the object;
- determining, based at least in part on the yaw and the movement state, a classification associated with the object, the classification indicating that the object is one of a followable object or an unfollowable object; and
- wherein controlling the vehicle comprises, based at least in part on the classification, at least one of:
  - causing the vehicle to traverse the environment within the projection of the object; or
  - causing the vehicle to move laterally outside of the projection of the object.

10. The method of claim 9, further comprising:
- determining, based at least in part on the classification associated with the object, that the object is the unfollowable object;
- projecting the object onto the lateral motion boundary to determine an intersection between the object and the lateral motion boundary; and
- determining the width associated with the object based at least in part on the intersection.

11. The method of claim 8, further comprising:
- projecting the lateral motion boundary to a future position along a path of the vehicle to determine an intersection between the object and the lateral motion boundary; and
- determining the width associated with the object based at least in part on the intersection.

12. The method of claim 8, further comprising:
- determining that the second width associated with the modified lateral motion boundary is greater than a third width representing a width of the vehicle and a safety margin associated with the vehicle; and
- wherein controlling the vehicle comprises causing the vehicle to follow a trajectory along a center of the modified lateral motion boundary.

13. The method of claim 8, further comprising:
- determining that the second width associated with the modified lateral motion boundary is less than a third width representing a width of the vehicle and a safety margin associated with the vehicle,
- wherein controlling the vehicle includes at least one of:
  - causing the vehicle to perform a safe stop operation; or
  - controlling the vehicle based at least in part on a route model.

14. The method of claim 8, further comprising determining the first width associated with the lateral motion boundary based at least in part on at least one of a third width of a roadway that the vehicle is traversing in the environment or a fourth width of a lane of the roadway.

15. One or more non-transitory computer-readable media storing instructions executable by a processor, wherein the instructions, when executed, cause the processor to perform operations comprising:
- determining a lateral motion boundary associated with a simulated vehicle in a simulated environment of a driving simulation including a simulated autonomous vehicle that is different from the simulated vehicle, the lateral motion boundary having a first width;
- determining, for a simulated object in the simulated environment, a projection of the simulated object onto the lateral motion boundary;
- modifying, based at least in part on a width associated with the simulated object, the lateral motion boundary to determine a modified lateral motion boundary associated with the simulated vehicle, the modified lateral motion boundary having a second width that is less than the first width;
- determining that the modified lateral motion boundary satisfies a threshold width; and
- controlling the simulated vehicle based at least in part on the modified lateral motion boundary satisfying the threshold width.

16. The one or more non-transitory computer-readable media of claim 15, the operations further comprising:
- receiving log data associated with the simulated object;
- determining, based at least in part on the log data, a yaw associated with the simulated object and a movement state associated with the simulated object;
- determining, based at least in part on the yaw and the movement state, a classification associated with the simulated object, the classification indicating that the simulated object is one of a followable simulated object or an unfollowable simulated object; and
- wherein controlling the simulated vehicle comprises, based at least in part on the classification, at least one of:

causing the simulated vehicle to traverse the simulated environment within the projection of the simulated object; or causing the simulated vehicle to move laterally outside of the projection of the simulated object.

17. The one or more non-transitory computer-readable media of claim 16, the operations further comprising:

determining, based at least in part on the classification associated with the simulated object, that the simulated object is the unfollowable object;

projecting the simulated object onto the lateral motion boundary to determine an intersection between the simulated object and the lateral motion boundary; and determining the width associated with the simulated object based at least in part on the intersection.

18. The one or more non-transitory computer-readable media of claim 15, the operations further comprising:

projecting the lateral motion boundary to a future position along a path of the simulated vehicle to determine an intersection between the simulated object and the lateral motion boundary; and determining the width associated with the simulated object based at least in part on the intersection.

19. The one or more non-transitory computer-readable media of claim 15, the operations further comprising:

determining that the second width associated with the modified lateral motion boundary is greater than a third width representing a width of the simulated vehicle and a safety margin associated with the simulated vehicle; and wherein controlling the simulated vehicle comprises causing the simulated vehicle to follow a trajectory along a center of the modified lateral motion boundary.

20. The one or more non-transitory computer-readable media of claim 15, the operations further comprising:

determining that the second width associated with the modified lateral motion boundary is less than a third width representing a width of the simulated vehicle and a safety margin associated with the simulated vehicle, wherein controlling the simulated vehicle includes at least one of:

causing the simulated vehicle to perform a safe stop operation; or controlling the simulated vehicle based at least in part on a trained model.

* * * * *